(12) United States Patent
Morita et al.

(10) Patent No.: US 7,125,594 B2
(45) Date of Patent: Oct. 24, 2006

(54) WRITE-ONCE OPTICAL RECORDING MEDIUM

(75) Inventors: Seiji Morita, Yokohama (JP); Masatoshi Sakurai, Tokyo (JP); Katsuyuki Naito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/897,097

(22) Filed: Jul. 23, 2004

(65) Prior Publication Data

US 2005/0052986 A1    Mar. 10, 2005

(30) Foreign Application Priority Data

Jul. 24, 2003    (JP)    ............................. 2003-201130

(51) Int. Cl.
*B32B 3/02*    (2006.01)

(52) U.S. Cl. .................. 428/64.1; 428/64.4; 428/64.8; 430/270.14; 369/275.4

(58) Field of Classification Search .............. 369/275.4
See application file for complete search history.

(56) References Cited

U.S. PATENT DOCUMENTS 5,500,266 A * 3/1996 Durnin ...................... 428/64.1
5,591,501 A * 1/1997 Ovshinsky et al. ......... 428/64.1
5,799,007 A * 8/1998 Lee et al. ................ 369/275.4
5,904,969 A * 5/1999 Kamezaki et al. ......... 428/64.1
2003/0193882 A1* 10/2003 Suenaga et al. .......... 369/275.4

FOREIGN PATENT DOCUMENTS

JP    7-287866    10/1995
JP    2000-276770    10/2000

OTHER PUBLICATIONS

Notification of Reasons for Rejection issued by Japanese Patent Office mailed Mar. 14, 2006, in Japanese Application No. 2003-201130, and English translation of Notice.

* cited by examiner

*Primary Examiner*—Elizabeth Mulvaney
(74) *Attorney, Agent, or Firm*—Finnegan, Henderson, Farabow, Garrett & Dunner, L.L.P.

(57) ABSTRACT

A write-once optical recording medium has a transparent resin substrate having a concentric groove or a spiral groove and having recessed cells defining recording regions that are arranged in the groove, a recording film comprising an organic dye formed to fill the cells, and a metal reflection film formed on the recording film.

10 Claims, 2 Drawing Sheets

WRITE-ONCE OPTICAL RECORDING MEDIUM

CROSS-REFERENCE TO RELATED APPLICATIONS

This application is based upon and claims the benefit of priority from prior Japanese Patent Application No. 2003-201130, filed Jul. 24, 2003, the entire contents of which are incorporated herein by reference.

BACKGROUND OF THE INVENTION

1. Field of the Invention

The present invention relates to a write-once optical recording medium capable of achieving a high recording density.

2. Description of the Related Art

With spread of personal computers in recent years, importance of media for storing digital data is being enhanced. Recently, a recording medium capable of recording-reproducing digital data has come to be mounted to home electric appliances such as a digital video appliance in addition to a digital audio appliance. A recording medium for storing digital data has also come to be used in mobile appliances such as cellular phones. A disk-type medium, i.e., a recording disk, is widely used as such a recording medium because it permits easily performing recording-reproducing of a large amount of digital data, it is capable of achieving a high random access performance, and it is inexpensive.

The recording disk includes a magnetic disk and an optical disk. The magnetic disk is a magnetic recording type medium represented by a hard disk. The optical disk is an optical recording type medium represented by CD-R, CD-RW, DVD-R and DVD-RW.

The optical disk is based on CD standards (such as red book) and DVD standards (such as DVD book) and, thus, is excellent in its compatibility and in its removability. To be more specific, it is possible to carry an optical disk having information written with a certain drive, and to write and read information in and out of the optical disk with another drive.

The optical disk includes a read-only type (ROM) such as CD-DA, CD-ROM, DVD-VIDEO and DVD-ROM, a write-once type, in which information can be written only once, such as CD-R and DVD-R, and a rewritable type in which information can be written many times such as CD-RW and DVD-RW. As the optical disk capable of recording, the write-once type optical disk such as CD-R and DVD-R employing an organic dye in the recording layer, is most widely used because the manufacturing cost of the disk is low and, thus, the disk of this type is inexpensive. It should also be noted that, where the data capacity is as large as 700 megabytes or more, it is substantially unnecessary to erase data in preparation for the writing of new data. Thus, it practically suffices for the recording medium to be capable of writing information only once. The particular situation also provides the reason for the spread of CD-R and DVD-R.

In the write-once optical disk employing an organic dye, a recording region defined by grooves is irradiated with a laser beam. As a result, the resin substrate is heated to a temperature not lower than the glass transition point Tg of the resin substrate. At the same time, a film of the organic dye within the groove performs a photochemical reaction so as to set up a negative pressure. It follows that the resin substrate is deformed within the groove. The deformation of the resin substrate is utilized for forming a recording mark.

However, two serious problems remain unsolved in the write-once type optical disk. One of the problems is that a limit of high-speed recording is being reached in the DVD-R drive that is available nowadays. Presently, the highest recording rate in the DVD-R drive is four-times speed (4×), i.e., 3.49 m/sec×4=13.96 m/sec. In the DVD-R disk for high-speed recording, the groove is formed shallow, and the film of the organic dye is designed thin so as to achieve a high sensitivity. However, the shallow groove implies that the deformation amount of the substrate is small. Therefore, if the groove is formed shallower for improving the sensitivity, it is impossible that the recorded marks produce a sufficiently high phase difference, leading to a low degree of the signal modulation. It follows that read error for the data tends to be generated, resulting in failure to satisfy the DVD book standards. It should also be noted that the degree of the signal modulation of the land pre-pit arranged as address data is also lowered. It follows that the read error for the address data tends to be generated, resulting in failure to satisfy the DVD book standards.

The other problem to be noted is that a limit is being reached in data recording density for the DVD-R available nowadays. In order to improve further the recording density, it is necessary to decrease the size of the recording mark itself. However, since the shortest wavelength of the semiconductor laser is about 400 nm and the maximum numerical aperture of the objective lens is 0.65 to 0.85 nowadays, a limit is being reached in the spot diameter itself of the laser beam. It is very difficult to record a small mark with a high accuracy and to reproduce the recorded small mark by using a relatively large light spot.

As described above, it was difficult to satisfy both the higher recording speed and the higher recording density simultaneously in the conventional write-once optical recording medium such as a DVD-R.

BRIEF SUMMARY OF THE INVENTION

An object of the present invention is to provide a write-once optical recording medium capable of achieving a higher recording speed and a higher recording density.

According to an aspect of the present invention, there is provided a write-once optical recording medium, comprising: a transparent resin substrate having a concentric groove or a spiral groove and having recessed cells defining recording regions that are arranged in the groove; a recording film comprising an organic dye formed to fill the cells; and a metal reflection film formed on the recording film.

According to another aspect of the present invention, there is provided an optical recording medium, comprising: a substrate made of transparent resin, having a groove and recessed cells in the groove; a recording film comprising an organic dye formed to fill the cells on the substrate; and a metal film formed on the recording film.

DETAILED DESCRIPTION OF THE INVENTION

Figure 1:
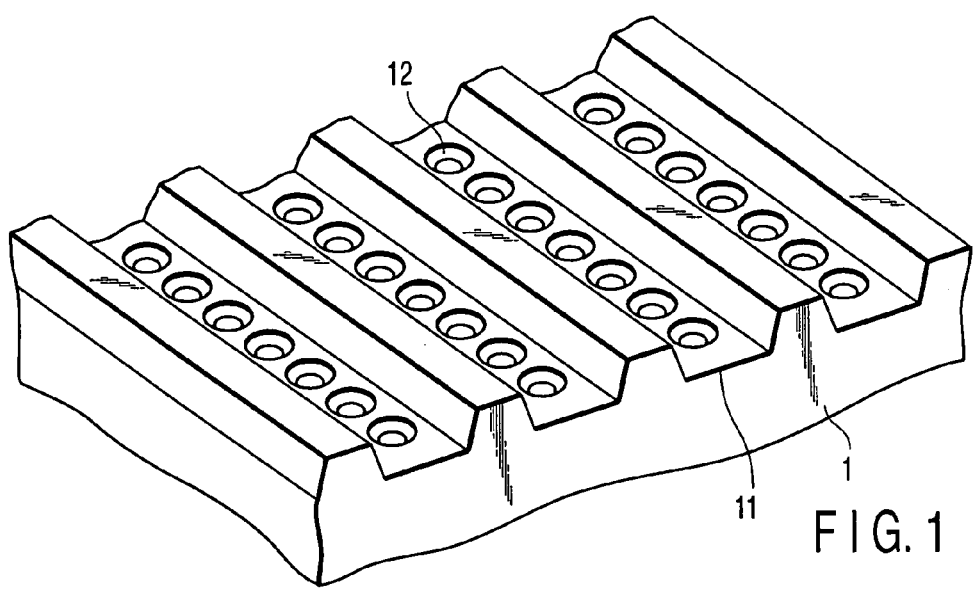
FIG. 1 is a perspective view of a disk substrate in the write-once optical recording medium (DVD-R) for Example 1.

The constituent members will now be described first in respect of the write-once optical recording medium according to embodiments of the present invention.

The transparent resin substrate, which is generally in the shape of a disk, is typically made of polycarbonate. A concentric groove or a spiral groove is formed in the transparent resin substrate. Recessed cells defining recording regions are arranged within the groove. Such a transparent resin substrate can be manufactured by injection molding using a stamper.

The organic dye used for the recording film is, for example, a cyanine dye or a phthalocyanine dye. It is sufficient that the organic dye fills at least the cells, and it is unnecessary that the organic dye fills the entire groove.

Examples of materials for the metal reflection film include Ag, Au, and Ag alloy such as AgNdCu, AgBi and AgNdBi. The metal reflection film improves reflectance before and after recording, and improves quality of tracking error signals (push-pull signals) and address signals (groove wobble signals). The metal reflection film also functions as a heat-diffusion control layer so as to easily deform cells at high sensitivity in recording operation, while suppressing deformation of potions between cells. Further, the metal reflection film has functions to improve resistance against a read beam and to improve shelflife. From the viewpoint of the shelflife, the metal reflection film should have a thickness of between about 50 and 200 nm. However, when the metal reflection film is too thick, cell deformation may be caused due to film stress. Thus, the thickness of the metal reflection film should be 130 nm or less. On the other hand, since unrecorded cells should have a reflectance of 5% or more (for a blue laser beam with a wavelength of 405 nm), the thickness of the metal reflection film should be 70 nm or more. Therefore, thickness of the metal reflection film ranges from 70 nm to 130 nm.

In the write-once optical recording medium using the organic dye noted above, the recording marks are formed using deformation of the resin substrate caused by irradiation with a laser beam. Therefore, in order to achieve high-speed recording and high-density recording, it is necessary to form the deformed portion of the resin substrate rapidly and finely. In the write-once optical recording medium according to the embodiments of the present invention, the recording marks are formed by deforming that portion of the transparent resin substrate corresponding to the bottom surface of the cell. In this case, one recording mark may be formed using a single cell or two or more cells.

In the write-once optical recording medium according to the embodiments of the present invention, if only the organic dye fills the fine cells formed in the groove, it is possible to deform those portion of the transparent resin substrate corresponding to the bottom surfaces of the fine cells. Therefore, it is possible to decrease the amount of the organic dye, compared with the prior art, making it possible to improve sensitivity. Also, if the depth of the cell is designed appropriately in view of the deformation amount in that portion of the substrate within the cell, it is possible to cause a sufficiently large deformation amount of the substrate and, thus, it is possible to bring about a sufficiently high phase difference among the marks so as to increase mark modulation. In addition, since the starting point and the ending point of the recording marks are determined by the positions of the cells formed in advance, the time fluctuation of the recording marks can be suppressed, and the jitter can be made very low.

In the write-once optical recording medium according to the embodiments of the present invention, deformation of the substrate is generated within the cell even if the spot size of a recording beam is large. Therefore, if the small cells are formed, it is possible to form a minimum recording mark that is determined by the cell size, making it possible to achieve high-density recording.

In the embodiments of the present invention, the condition defined by the formula given below is advantageous for generating a sufficient phase difference among marks:

$$D = \lambda/(k \times Ndy)$$

where D is a deformation amount of the substrate within a cell caused upon recording, $\lambda$ is a wavelength of a laser beam used for recording, Ndy is a refractive index of the organic dye, and k is a number in a range between 4.8 and 5.7.

The deformation amount D of the substrate within a cell caused upon recording is represented by the equation "D=Db−Da", where Db is a sum of the groove depth (Dg) and the cell depth (Dc) before recording, and Da is the depth to the rising upper portion of the cell by deformation after recording.

If the cell depth is designed appropriately in view of the deformation amount D of the substrate given above, it is possible to eliminate the influence given by the adjacent mark, i.e., crosstalk. Therefore, even in the case where the spot size of a read beam is large, it is possible to read the fine cells recorded at a high-density so as to achieve a high-density reproduction effectively.

To be more specific, if k in the formula given above falls within a range between 4.8 and 5.7, it is possible to obtain a high CNR (carrier-to-noise ratio) of 40 dB or more. However, if k comes out of the above range, it is impossible to obtain a sufficiently high CNR.

EXAMPLES

Example 1

FIG. 1 is a perspective view of the polycarbonate disk substrate used for manufacturing the write-once optical recording medium (DVD-R) for this Example. As shown in the drawing, a spiral groove 11 is formed so as to provide a continuous step on the surface of the disk substrate 1, and recessed cells 12 forming discrete steps and each having a circular opening are formed within the groove 11. These cells 12 are regularly arranged at a prescribed pitch so as to form one line within the groove 11. The cells 12 define the recording region.

Figure 2:
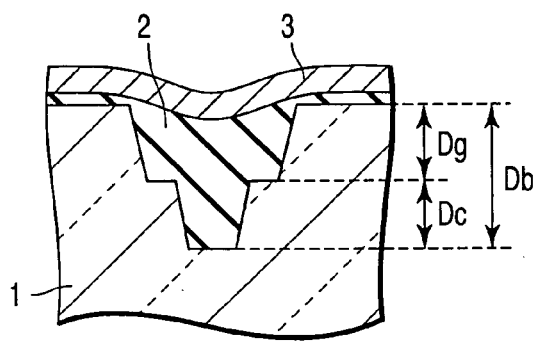
FIG. 2 is a cross sectional view of the cell in the DVD-R for Example 1 before recording.

FIG. 2 is a cross sectional view showing the cell in the DVD-R for this Example before recording. The surface of the disk substrate 1 is coated with an organic dye forming a recording film 2 such that the dye fills the cells 12, and the recording film 2 is covered with a metal reflection film 3. FIG. 2 shows the groove depth Dg, the cell depth Dc, and the sum Db of Dg and Dc.

Figure 3:
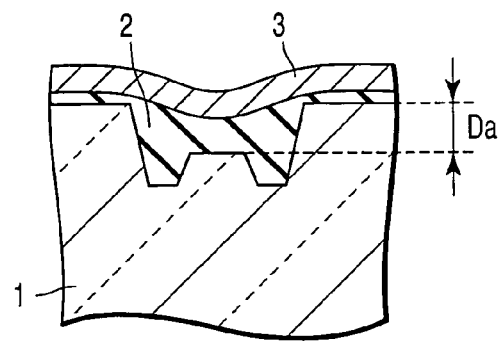
FIG. 3 is a cross sectional view of the cell in the DVD-R for Example 1 after recording.

FIG. 3 is a cross sectional view of the cell in the DVD-R for this Example after recording. The bottom portion of the cell 12 is deformed in a rising fashion by irradiation with a laser beam so as to form a recording mark. The distance Da shown in the drawing denotes the depth to the upper portion of the cell 12 after recording. The deformation amount D of the substrate within the cell 12 caused upon recording is represented by the formula (Db−Da).

A method of manufacturing the aforementioned DVD-R will now be described.

In the first step, a Ni stamper was prepared as follows. Specifically, a silicon wafer having a diameter of 200 mm was coated with a resist, followed by pre-baking the resist. Then, a spiral groove was written on the resist using an electron-beam cutting machine, followed by development. As a result, a pattern of a spiral groove was formed in the resist on the surface of the silicon wafer. In the next step, the surface of the silicon wafer was subjected to reactive ion etching (RIE) so as to form the spiral groove. Then, the silicon wafer was coated with a diblock copolymer by spin coating, followed by annealing the diblock copolymer so as to be self-assembled, thereby forming a pattern that circular domains were regularly arranged. Further, the circular domains within the groove and those portions of the substrate positioned below the circular domains were etched by RIE to form a cell train within the groove. Further, a Ni thin film was formed on the silicon wafer by sputtering, followed by Ni electroforming and peeling off the Ni plate, thereby manufacturing a Ni stamper.

It is possible to reproduce a large number of disk substrate 1 shown in FIG. 1 by performing injection molding of polycarbonate using the Ni stamper. It is possible to obtain the structure shown in FIG. 2 by successively forming films of a dye and a reflection metal on the disk substrate 1. In this Example, a cyanine dye for the blue laser recording, available from Hayashibara Biochemical Labs., Inc., was used. The refractive index of the dye was found to fall within a range between 1.8 and 2.7.

The groove depth Dg and the cell depth Dc are designed to obtain the optimum state in respect of the groove reflectance (track reflectance) before recording, the radial contrast, the push-pull signal modulation, the I11 modulation, and the I3 modulation.

For example, the groove width was set at 130 nm, the track pitch (groove pitch) was set at 360 nm, the cell size was set at 40 nm, the distance between the adjacent cells was set at 40 nm, the groove depth Dg was set at 35 nm, and the cell depth Dc was set at 25 nm (Db=60 nm). In this case, the depth Da to the upper portion of the cell after recording was 25.1 nm, and the deformation amount D of the substrate within the cell caused upon recording was 34.9 nm.

The manufactured DVD-R was subjected to a recording-reproducing test using an optical disk evaluating machine having a laser wavelength of 400 nm, the objective lens with a numerical aperture NA of 0.70, the eclipse coefficient of 0.9, and the wave aberration of 0.040 λrms. It was found possible to perform recording in cells of 40 nm.

Figure 4:
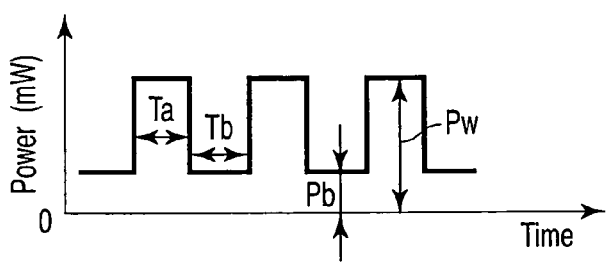
FIG. 4 is a timing chart exemplifying write strategy in respect of the DVD-R for Example 1.

FIG. 4 exemplifies a write strategy under a single frequency. As shown in the drawing, the recording medium is irradiated with a laser beam pulse having a pulse width Ta and an interval Tb equals to Ta. The symbol "Pw" shown in the drawing denotes a write power, and the symbol "Pb" denotes a blank power. The read characteristics of the DVD-R under the recording conditions given below will now be described.

Single frequency recording was performed such that information was recorded in two consecutive cells, and was not recorded in the succeeding two consecutive cells. The CNR (carrier-to-noise ratio) was found to be 59 dB under the conditions that Ta=Tb=3T, the mark length was 120 nm, the mark pitch was 240 nm, the write power Pw was 3.5 mW, the blank power Pb was 0.6 mW, and the linear velocity was 3.49 m/sec.

Also, the CNR was found to be 42 dB in single frequency recording, which was performed in a manner to record information in each cell, under the conditions that Ta=Tb=T, the mark length was 40 nm, the mark pitch was 80 nm, the write power Pw was 4 mW, the blank power Pb was 0.6 mW, and the linear velocity was 3.49 m/sec.

The jitter (data to clock) was found to be 9% in the case where 8/16 modulated random signals were recorded with the minimum recording mark length set at 120 nm (Ta=3T).

Also, the jitter (data to clock) was found to be 15% in the case where 8/16 modulated random signals were recorded with the minimum recording mark length set at 40 nm (Ta=T). However, the bit error rate after passing through a PRML (partial response maximum likelihood) evaluating circuit was found to be $2 \times 10^{-5}$, supporting that it was sufficiently possible to perform recording and reproducing.

Then, a high-speed recording test was conducted with the minimum recording mark length set at 280 nm. In the conventional DVD-R, the highest linear velocity at which the jitter after recording was maintained at a level of 10% or less was found to be 17.4 m/sec, which corresponds 5× DVD. On the other hand, in the DVD-R for Example 1, the jitter after recording was found to be 9.7% even in the case where the linear velocity was set at 29.6 m/sec, which corresponds to 8.5× DVD, supporting that the write-once optical recording medium of this Example makes it possible to perform high-speed recording.

Various DVD-R's were manufactured by changing the cell depth. To be more specific, various DVD-R's were manufactured by the manufacturing method substantially equal to that described above, except that the cell depth Dc alone was changed, with the groove depth Dg set constant at 40 nm, with the cell size set constant at 40 nm, and with the interval between the adjacent cells set at 40 nm. The recording-reproducing test was conducted as above in respect of each of these various DVD-R's.

Figure 5:
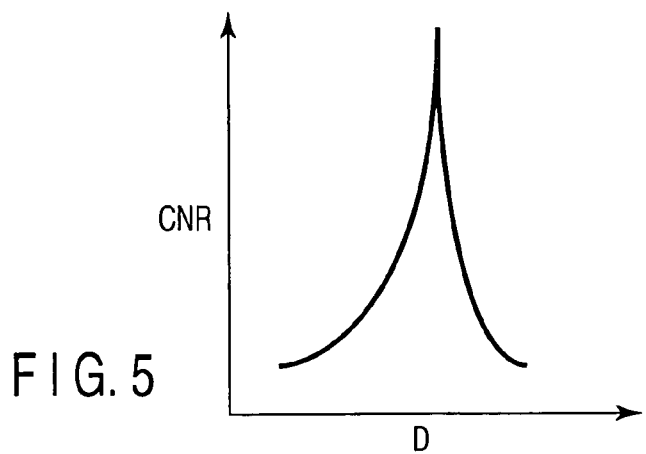
FIG. 5 is a graph showing the relationship between the deformation amount D of the substrate within the cell caused upon recording to the DVD-R for Example 1 and the measured CNR.

FIG. 5 is a graph showing the relationship between the deformation amount D of the substrate within the cell caused upon recording, and the measured CNR value. A high CNR value was obtained within a range satisfying the condition of:

$$D=\lambda/[(4.8 \sim 5.7) \times Ndy],$$

where λ is a wavelength of a laser beam, and Ndy is a refractive index of the organic dye. In particular, a maximal CNR value was obtained in the case where the cell depth was set to a range between 20 nm and 35 nm.

Example 2

Figure 6:
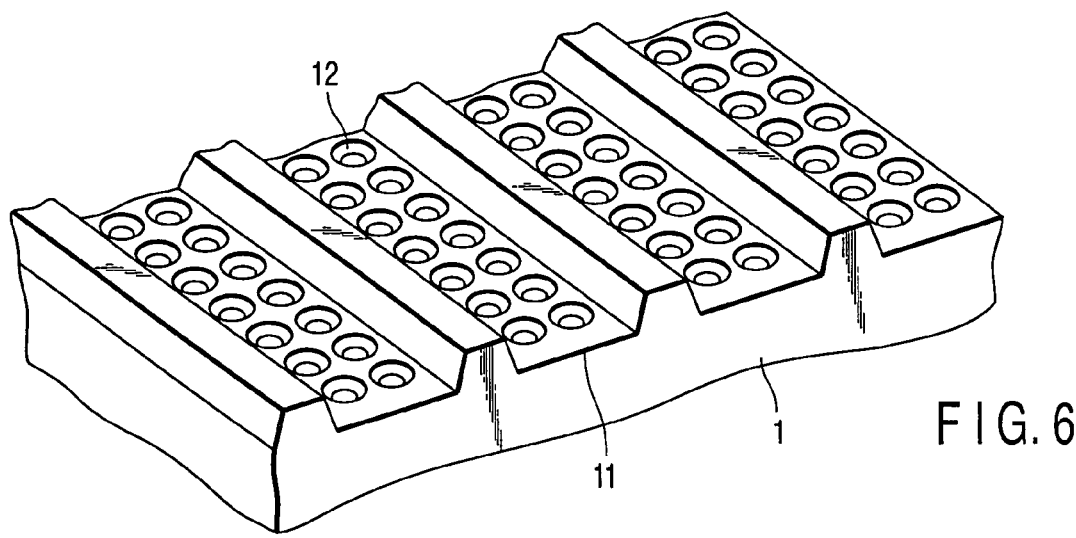
FIG. 6 is a perspective view of the disk substrate in the write-once optical recording medium for Example 2.

FIG. 6 is a perspective view of the polycarbonate disk substrate used for manufacturing the write-once optical recording medium (DVD-R) for Example 2. Example 2 differs from Example 1 in that the cells 12 were arranged in two lines within the groove 11.

In Example 2, the groove width was set at 90 nm, the track pitch (groove pitch) was set at 380 nm, the cell size was set at 40 nm, the interval between the adjacent cells was set at 40 nm, the groove depth Dg was set at 30 nm, and the cell depth Dc was set at 20 nm (Db=50 nm). In this case, the depth Da to the upper portion of the cell after recording was 18 nm, and the deformation amount D of the substrate within the cell caused upon recording was 32 nm. The write-once optical recording medium for Example 2 was equal to that for Example 1 in the other constructions.

The manufactured DVD-R was subjected to a recording-reproducing test using the optical disk evaluating machine equal to that used in Example 1.

Single frequency recording was performed such that information was recorded in two consecutive cells, and was not recorded in the succeeding two consecutive cells. The CNR was found to be 62 dB under the conditions that Ta=Tb=3T, the mark length was 120 nm, the mark pitch was 240 nm, the write power Pw was 3.5 mW, the blank power Pb was 0.6 mW, and the linear velocity was 3.49 m/sec.

Also, the CNR was found to be 48 dB in single frequency recording, which was performed in a manner to record information in each cell, under the conditions that Ta=Tb=T, the mark length was 40 nm, the mark pitch was 80 nm, the write power Pw was 4 mW, the blank power Pb was 0.6 mW, and the linear velocity was 3.49 m/sec.

The jitter (data to clock) was found to be 8.5% in the case where 8/16 modulated random signals were recorded with the minimum recording mark length set at 120 nm (Ta=3T).

Also, the jitter (data to clock) was found to be 12% in the case where 8/16 modulated random signals were recorded with the minimum recording mark length set at 40 nm (Ta=T). However, the bit error rate after passing through a PRML evaluating circuit was found to be $7\times10^{-6}$, supporting that it was sufficiently possible to perform recording-reproducing.

Then, a high-speed recording test was conducted with the minimum recording mark length set at 280 nm. In the DVD-R for Example 2, the jitter after recording was found to be 10% or less even in the case where the linear velocity was set at 26.1 m/sec, which corresponds to 7.4× DVD, supporting that the write-once optical recording medium of this Example makes it possible to perform high-speed recording.

Figure 7:
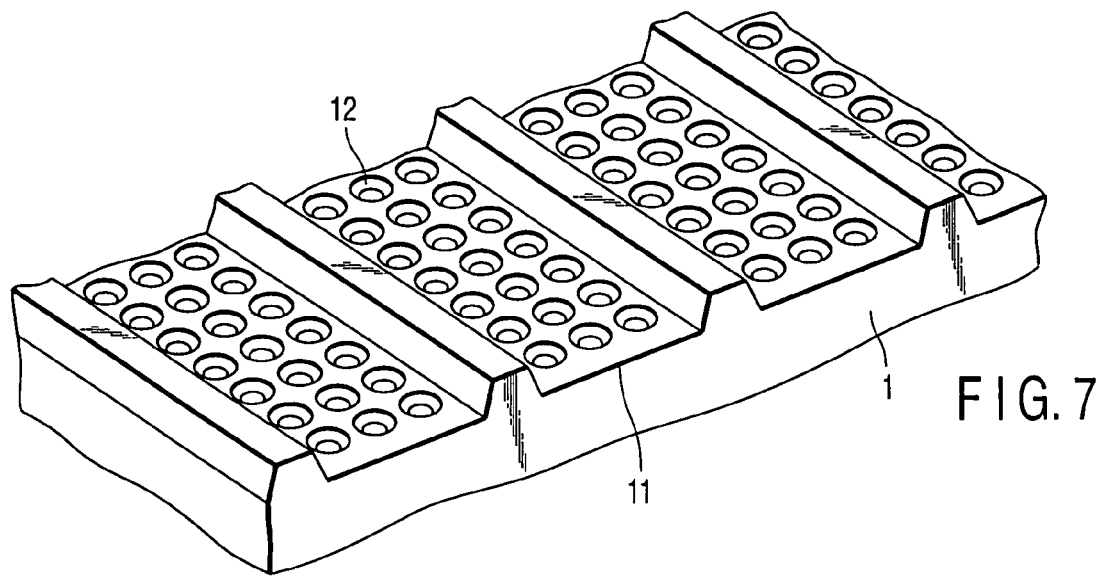
FIG. 7 is a perspective view of the disk substrate in the write-once optical recording medium for another Example.

Incidentally, it is also possible to use a disk substrate 1 in which the cells 12 are arranged to form three lines within the groove 11, as shown in FIG. 7.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A write-once optical recording medium, comprising:
   a transparent resin substrate having a concentric groove or a spiral groove and having recessed cells defining recording regions that are arranged in the groove;
   a recording film comprising an organic dye formed to fill the cells; and
   a metal reflection film formed on the recording film,
   wherein a deformation amount D of the substrate within a cell caused upon recording satisfies the following formula:

$$DA=\lambda/[k\times Ndy]$$

where $\lambda$ is a wavelength of a laser beam used for recording, Ndy is a refractive index of the organic dye, and k is a number in a range between 4.8 and 5.7.

2. The write-once optical recording medium according to claim 1, wherein the cells are formed in one line in the groove.

3. The write-once optical recording medium according to claim 1, wherein the cells are formed in two or more lines in the groove.

4. The write-once optical recording medium according to claim 1, wherein the organic dye is selected from the group consisting of a cyanine dye and a phthalocyanine dye.

5. The write-once optical recording medium according to claim 1, wherein the cell has a depth in a range between 20 nm and 35 nm.

6. An optical recording medium, comprising:
   a substrate made of transparent resin, having a groove and recessed cells in the groove;
   a recording film comprising an organic dye formed to fill the cells on the substrate; and
   a metal film formed on the recording film,
   wherein a deformation amount D of the substrate within a cell caused upon recording satisfies the following formula:

$$D=\lambda/[k\times Ndy]$$

where $\lambda$ is a wavelength of a laser beam used for recording, Ndy is a refractive index of the organic dye, and k is a number in a range between 4.8 and 5.7.

7. The optical recording medium according to claim 6, wherein the cells are formed in one line in the groove.

8. The optical recording medium according to claim 6, wherein the cells are formed in two or more lines in the groove.

9. The optical recording medium according to claim 6, wherein the organic dye is selected from the group consisting of a cyanine dye and a phthalocyanine dye.

10. The optical recording medium according to claim 6, wherein the cell has a depth in a range between 20 nm and 35 nm.

* * * * *

UNITED STATES PATENT AND TRADEMARK OFFICE
CERTIFICATE OF CORRECTION

PATENT NO. : 7,125,594 B2 Page 1 of 1
APPLICATION NO. : 10/897097
DATED : October 24, 2006
INVENTOR(S) : Morita et al.

It is certified that error appears in the above-identified patent and that said Letters Patent is hereby corrected as shown below:

Claim 1, column 8, line 8, change "DA=$\lambda$/[k×Ndy]" to --D = $\lambda$ / [k × Ndy]--.

Signed and Sealed this

Ninth Day of January, 2007

JON W. DUDAS
*Director of the United States Patent and Trademark Office*